United States Patent [19]

Prestifilippo et al.

[11] Patent Number: 5,446,889
[45] Date of Patent: Aug. 29, 1995

[54] COMPUTER-BASED METHODS FOR DETERMINING THE HEAD OF A LINKED LIST

[75] Inventors: James Prestifilippo, Chalfont; Clark C. Kogen, West Chester, both of Pa.

[73] Assignee: Unisys Corporation, Blue Bell, Pa.

[21] Appl. No.: 278,179

[22] Filed: Jul. 21, 1994

[51] Int. Cl.⁶ ............................................. G06F 17/30
[52] U.S. Cl. ................................... 395/600; 395/700; 364/957.3; 364/963.5; 364/DIG. 2
[58] Field of Search ................................ 395/600, 700

[56] References Cited

PUBLICATIONS

Horowitz et al "Fundamentals of Data Structures In Pascal" Comp. Sci. Press, pp. 211∝224, 1990.

*Primary Examiner*—Thomas G. Black
*Assistant Examiner*—Peter Y. Wang
*Attorney, Agent, or Firm*—Woodcock Washburn Kurtz Mackiewicz & Norris

[57] ABSTRACT

A computer-based method for identifying the head of a linked list stored in a memory comprises the steps of (a) retrieving an element of the list from the memory, (b) identifying from the pointer of the retrieved element, the next subsequent stored element of the list, (c) marking the next subsequent stored element; and (d) repeating steps (a) through (c) for each stored element of the list. After processing each element, the stored element that is not marked is identified as the head of the linked list. In an alternate embodiment, an element of the list is selected as a possible candidate for head of the list, and the list is then traversed from the selected element to the end of the list. A count of the number of linkages between the selected element and the end of list is generated as the list is traversed, and each element accessed while traversing the list is marked "visited". Each other element of the list is then processed in the same manner, except that elements already visited are not processed. Additionally, if while traversing the linkages from a candidate element to the end of the list, an element is encountered that was previously "visited", then the linkage count associated with the previously visited element is added to the linkage count generated up until that point for the candidate element. Upon completion, the element with the largest linkage count is identified as the head of the list.

10 Claims, 4 Drawing Sheets

COMPUTER-BASED METHODS FOR DETERMINING THE HEAD OF A LINKED LIST

FIELD OF THE INVENTION

The present invention relates to computer processing of linked lists, and more particularly, to computer-based methods for reestablishing the head of a linked list when such information has been lost.

BACKGROUND

Computer systems maintain lists of information in a wide variety of applications. For example, many mainframe computers maintain a list, or queue, of processes to be executed by one or more processing units. Such process queues are often maintained by the operating system in a reserved memory area. As another example, many computers that employ magnetic disk storage devices maintain a list of available or unused storage locations on the disk. One common form of list employed in many of these applications is known in the art as a linked list. A linked list typically comprises a plurality of stored elements, or nodes, linked sequentially through the use of pointers. A linked list may be either singularly or doubling linked. With a singularly linked list, each stored element points only to the next subsequent element of the list. With a doubly linked list, each element points to the next subsequent element as well as the immediately preceding element of the list. Because pointers are used to link each successive element, the elements do not have to be stored in contiguous memory locations.

Each element of a singularly linked list typically comprises a data portion and a pointer to the next subsequent element of the list. Each element represents a single entry, or item, in the list and contains information relevant to that item. For example, in the case of a process queue for maintaining a list of processes to be executed by a computer system, each element of the list represents a single process and contains information relevant to the execution of that process, such as its priority, etc.

A singularly linked list has a "head", i.e., the first element of the list, and a defined end point, i.e., the last element of the list. Typically, the end of the list is established by setting the pointer of the last element to a null value. A special pointer is often defined in order to identify the head of a linked list.

Unfortunately, computer systems are susceptible to failure or unexpected shutdown in a number of situations, such as power outages and equipment failures. In these situations, partial or even complete memory loss is not uncommon. Consequently, information relating to the status or structure of a linked list, particularly information identifying the head of the list, can be lost. In such cases, it will be necessary to reestablish the head of the linked list before normal system operation can resume.

One particular situation in which information concerning the head of a queue may be lost arises in connection with the diagnoses of hardware and/or software problems in UNISYS A Series mainframe computers. UNISYS A Series computers provide an ability to dump the contents of main memory to a storage device, such as a peripheral tape drive, so that the contents of memory can be analyzed with a specialized diagnostic tool. A Series systems maintain a "ready queue" which, in general, is a singularly linked list of processes that are "ready" to be executed, but are awaiting to be scheduled on an available processor. On certain classes of A series computers, a special purpose instruction processor, called the Task Control Processor (TCP), is responsible for process scheduling and maintaining the ready queue. The ready queue is not managed by the operating system, and therefore, the data structure is not maintained in normal system memory. As a result, dumping the contents of normal system memory for analysis purposes does not provide a copy of the ready queue. However, the memory dump process does gather state information from the TCP, including information identifying the state of all processes in existence at the time of the memory dump. Specifically, for each process, information concerning the state (e.g., active, blocked, ready, etc.) is provided, and in the case of those processes that are indicated as being "ready", a pointer to the next process in the ready queue is provided. Thus, the individual elements and linkages of the ready queue are intact and available for analysis. Unfortunately, however, the process at the head of the ready queue is not explicitly identified. For proper diagnosis of hardware and software problems, the head of the ready queue must be reestablished.

As the foregoing illustrates, in many situations it may be necessary to reconstruct or reestablish the head of a linked list. Accordingly, methods are needed for quickly and efficiently establishing the head of a linked list in cases where such information has been lost. One technique for determining the head of a linked list, but which the inventors have found to be disadvantageous, involves accessing each stored element of the list and traversing the list from that element to the end of list. For each element, a count of the number of linkages originating from that element to the end of the list is generated. The element having the largest linkage count will, of course, be the head of the list. Unfortunately, generating a linkage count for each element by traversing the list from that element to the end of the list requires on the order of $N^2$ memory accesses, where N is the number of elements in the list. With large lists, the time required to establish the head of the list using this technique becomes prohibitive. Consequently, more efficient and faster techniques for establishing the head of a singularly linked list are needed. The methods of the present invention satisfy this need.

SUMMARY OF THE INVENTION

The present invention is directed to methods for establishing, or reestablishing, the head of a linked list when such information has been lost or simply not provided. Typically, the linked list will be stored in some form of memory. For purposes of the present invention, it is assumed that the linked list is not circular and that the list is intact. Additionally, it is assumed that the list is finite and that it is possible to access each element individually, i.e., the locations of each element are known or ascertainable. The present invention may be employed in a wide variety of applications to establish the head of a linked list more quickly and efficiently than prior art methods.

According to one embodiment of the present invention, each element of the list is retrieved from the memory, and if the element has a pointer to a next subsequent element of the list (i.e, the current element is not the end of the list), that next subsequent element is marked. A marked element cannot be the head of the list since the mark indicates that another element precedes it. After accessing and processing each element in this manner, the only element not marked should be the head of the list, since by definition, the head of a singularly linked list has no other element pointing to it. Accordingly, the head of the list can be identified by examining each element and identifying which of those elements is not marked.

According to a second embodiment, an element of the list is selected as a candidate for the head of the list. The list is then traversed from that element to the end of the list by following the pointers of each successive element until the end of the list is reached. A count of the number of linkages between the selected element and the end of list is generated as the list is traversed. Additionally, each element accessed while traversing the list from the selected element to the end of the list is marked as having been "visited". When processing of the current candidate is complete, another element of the list is selected and processed in the same manner. However, according to an important feature of the second embodiment, if an element selected for processing as a candidate for head of the list has already been "visited" (i.e., during a previous traversal of the list), then no further processing of that element is necessary since that element must have been part of some longer chain. Additionally, according to another important feature of the present embodiment, if while traversing the linkages from a candidate element to the end of the list, an element is encountered that was previously "visited", then the linkage count associated with the previously visited element is added to the linkage count generated up until that point for the candidate element. No further processing of the present candidate is necessary. Such a feature avoids the need to traverse the remainder of the linked list for that candidate element.

The foregoing embodiments of the present invention may be employed in a wide variety of systems and applications in which the head of a linked list must be reestablished. For example, the methods of the present invention may be implemented as part of a computer system diagnostic tool for analyzing the contents of a memory dump in order to diagnose hardware and software problems. In particular, the methods of the present invention may be employed by the diagnostic tool to reestablish the head of a linked list stored in the memory when such information is either lost during the memory dump or simply not provided as part of the memory dump.

Other features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF THE PREFERRED EMBODIMENTS

Figure 1:
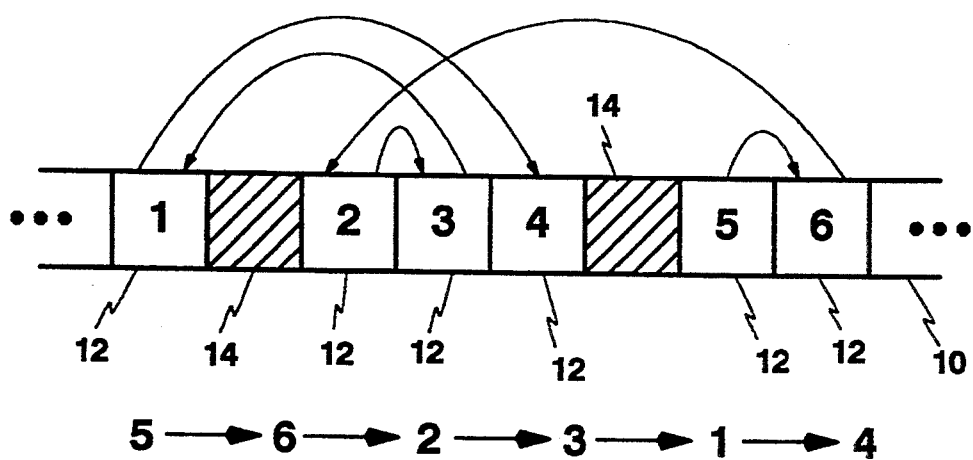
FIG. 1 shows an exemplary computer memory containing the stored elements of an exemplary singularly linked list.

Referring to the drawings, wherein like numerals indicate like elements throughout, there is shown in FIG. 1 an exemplary computer memory 10 containing a plurality of stored elements defining an exemplary singularly linked list. The memory 10 may comprise a random-access-memory (RAM), read-only-memory (ROM), optical or magnetic tape or disk, or any other suitable storage medium. In the example shown, the linked list comprises a set of stored elements $\{1,2,\ldots 6\}$ each occupying a different location 12 in memory 10. Shaded portions 14 represent memory locations not occupied by the linked list. A unique memory address (not shown) is associated with each of the respective storage locations 12. Each stored element of the list contains a pointer (indicated by the respective arrows) that identifies, or points to, the next subsequent stored element of the list. As such, the stored elements are not required to occupy contiguous memory locations, nor are they required to be stored in any particular order. The pointers to each successive element define the linkages and structure of the list. Typically, the pointer to a next subsequent element will comprise the memory address, or location, of that next element. The exemplary linked list of FIG. 1 is representative of linked lists used in a wide variety of applications. For example, the linked list of FIG. 1 may comprise a queue of processes to be executed by a computer system, in which case, each element represents a respective one of the processes and contains information related to the execution of that process.

As mentioned in the Background of the Invention, it is crucial for processing purposes that the head of a linked list be known. Typically, a separate "head pointer" is provided that indicates the address of the element that occupies the head of the list. Without such information, it would be impossible to perform list operations, such as insertion and deletion of selected elements. Unfortunately, as explained above, circumstances may arise in which the "head pointer" is somehow lost or destroyed. For example, system memory may be compromised during a power failure, or a magnetic disk or tape containing a linked list may be corrupted in such a way that the head pointer is erased or destroyed. However, despite loss of the head pointer, the individual stored elements that comprise the list may remain intact. Accordingly, normal processing can resume if the head of the linked list can be reestablished in an efficient manner.

Figure 2:
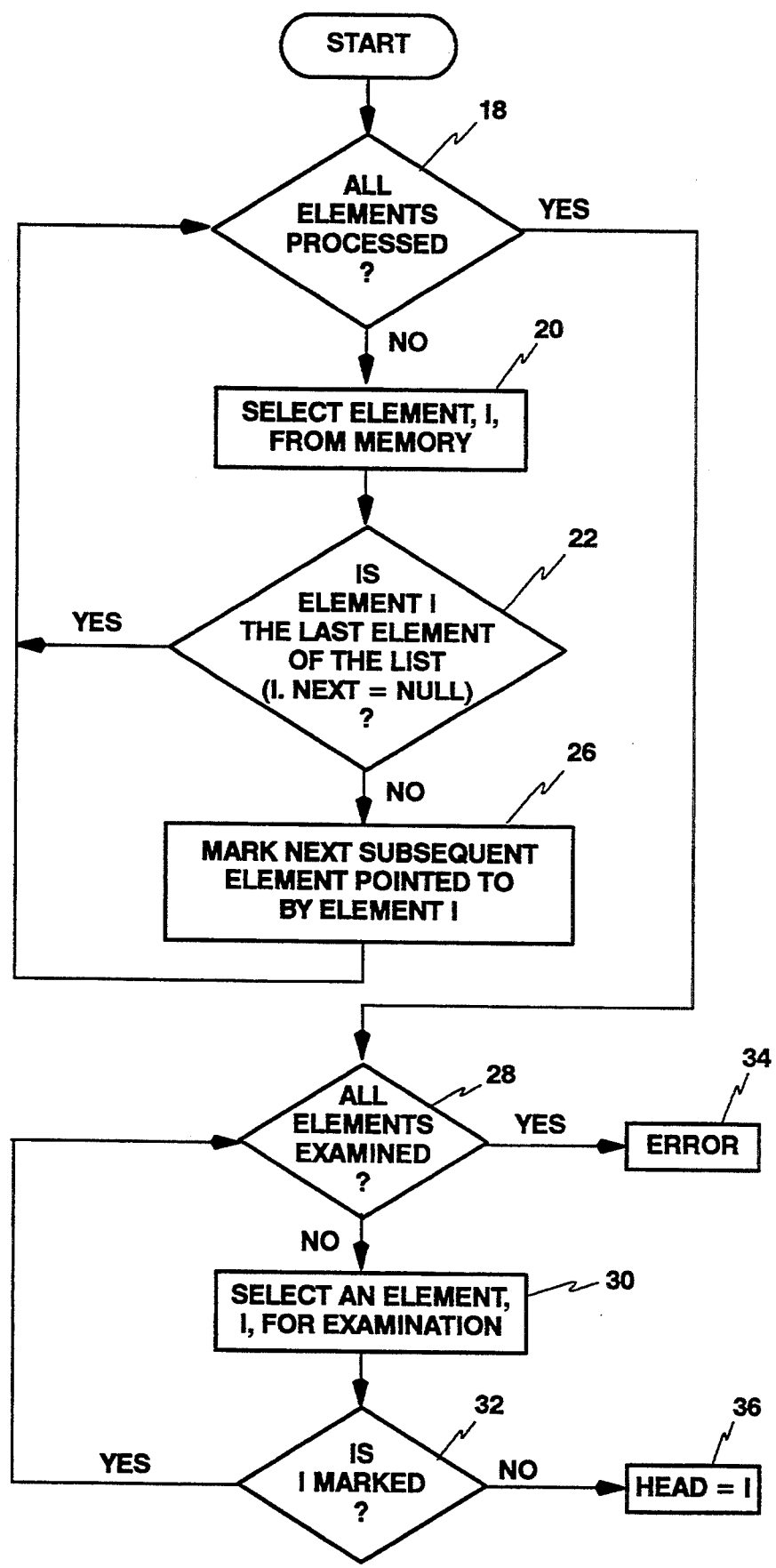
FIG. 2 is flow diagram illustrating a method for establishing the head of a linked list in accordance with one embodiment of the present invention.

FIG. 2 is a flow diagram illustrating one embodiment of a method for reestablishing the head of a linked list in accordance with the present invention. The method assumes that the list is not circular (i.e., the tail does not point to the head) and that the list is intact. Additionally, the method assumes that the list is finite and that it is possible to access each element individually, i.e., the locations of each element are known or ascertainable. The method of FIG. 2 may be implemented and executed on any general or special purpose processor having access to the memory in which the elements of the list are stored.

According to the present embodiment, each element of the list is examined, in turn, and if the element has a pointer to a next subsequent element of the list (i.e, the current element is not the end of the list), that next subsequent element is marked. A marked element cannot be the head of the list since the mark indicates that another element precedes it. After accessing and processing each element in this manner, the only element not marked should be the head of the list, since by definition, the head of a singularly linked list has no other element pointing to it. Accordingly, the head of the list can be identified by examining each element and identifying which of those elements is not marked.

In greater detail, referring to FIG. 2, the process begins at step 18 where it is determined whether all of the elements of the list have been processed. Presumably, upon initially entering step 18, none of the elements will have been processed, and therefore, control will pass immediately to step 20. At step 20, one of the stored elements of the list is selected (e.g., retrieved from the memory) for processing. Next, at step 22, the pointer of the selected element is examined to determine whether the selected element is the last element of the list. The pointer of the last element (i.e., tail) will have a predefined NULL value (i.e., I.NEXT=NULL). If the selected element is the tail, then control passes back to step 18. Assuming all of the elements have not been processed, control will again pass to step 20 where another element of the list is selected for processing. Control then passes to step 22. It should be noted that there is no limitation on the order in which the stored elements are selected for processing, so long as each element is selected once.

If at step 22, it is determined that the currently selected element is not the last element of the list, then control passes to step 26 where the pointer of the current element is examined to identify the next subsequent element of the list. Once identified, the next subsequent element is marked to indicate that it is pointed to by a preceding element (i.e, the current element), and therefore, cannot be a candidate for head of the list. Marking of an element can be achieved in a number of ways. For example, the data portion of the element may contain a field that can be set to a pre-defined value to indicate that the element has been marked. Alternatively, a processor operating in accordance with the present invention may create a separate data structure, such as an array, having a plurality of elements each corresponding to one of the stored elements of the list. When a particular stored element of the list is to be marked, the corresponding element of the array may be set to a value indicative of such marking.

After completing step 26, control will again pass back to step 18. Processing of selected elements will continue in this manner until all of the elements have been processed, at which point the condition at step 18 will be satisfied and control will pass to step 28. Steps 28–36 represent a second phase of the present embodiment wherein the stored elements (or the elements of a separate array) are examined to identify the one element that is not marked. A pointer may then be established to identify the unmarked element as the head of the list.

Specifically, at step 28, it is determined whether all of the elements of the list have been examined. Upon initially entering step 28, none of the elements will have been examined, and therefore, control should pass to step 30. At step 30, an element of the list is selected, and at step 32, the selected element is examined to determine if it was marked during the previous phase (i.e., steps 18–26). If so, control passes back to step 28. Examination of successive elements continues in this manner until either all of the elements have been examined (step 28) or an unmarked element is identified in step 32. When an unmarked element is identified in step 32, control passes to step 36 where the head pointer is set to the address or location of the unmarked element. At this point, the head of the linked list has been reestablished.

Assuming the linked list is intact and is not circular, one element of the list, i.e., the head, should always remain unmarked. Accordingly, if it is determined at step 28 that all elements have been processed, but no unmarked element has been identified, control passes to step 34 where a signal is generated alerting the system that an error has occurred.

As mentioned above, the method illustrated in FIG. 2 may be implemented on any suitable processor. An exemplary implementation of the foregoing method is expressed below in a Pascal-like notation:

--- let X = {1,2,3 . . . N} be the set of elements 1, 2, 3, . . . N of a singularly linked list;
let I represent an element of the set X where I.NEXT is the pointer to the next subsequent element of the linked list and I.MARKED is a field indicating whether the element has been marked;
(marking phase)
For each element I within the set X do the following:
. . .    Begin
           if I.NEXT < > NULL then
              Begin
              J := I.NEXT
              J.MARKED := TRUE;
              End
         End
(examining phase)
For each element I within the set X do the following:
. . .    Begin
           If Not I.MARKED then
              Begin
              HEAD := I;
              Exit Loop;
              End
         End
End

---

The foregoing implementation of the method of the present invention will complete in a time period proportional to the number of elements, N, of the linked list. Specifically, the method will complete in time proportional to N+1 in the best case, 2N in the worst case, and N+N/2 on average. Compared to the technique described in the Background of the Invention, which requires a time period on the order of $N^2$, the foregoing embodiment is an order of magnitude faster. For example, assuming that a linked list has 1000 elements and that it takes about 5 ms to access each element, the technique discussed in the Background of the Invention could require as many as 2500 seconds to identify the head of the list, whereas the method of the present invention will only require about 7.5 seconds. Accordingly, the method of the present invention is extremely efficient for use in any application in which the head of a linked list must be reestablished.

As an example, assume that it is necessary to determine the head of the exemplary linked list of FIG. 1. In this example, an array has been defined with elements corresponding to each of the elements of the linked list. The array is used to indicate that a particular element has been marked. A value of '1' in a particular element of the array indicates that the corresponding element of the linked list has been marked. The following table illustrates the status of the array after each element of the list is processed in accordance with steps 20–28 of FIG. 2. The example assumes that the elements are processed in the order shown.

| ELEMENT PROCESSED | ELEMENT MARKED | ARRAY VALUE {1,2,3,4,5,6} |
|---|---|---|
| — | — | 000000 |
| 1 | 4 | 000100 |
| 2 | 3 | 001100 |
| 3 | 1 | 101100 |
| 4 | (tail) | 101100 |
| 5 | 6 | 101101 |
| 6 | 2 | 111101 |

As illustrated, after processing each element, every element is marked except for element '5' Element '5' is the head of the linked list.

Figure 3A:
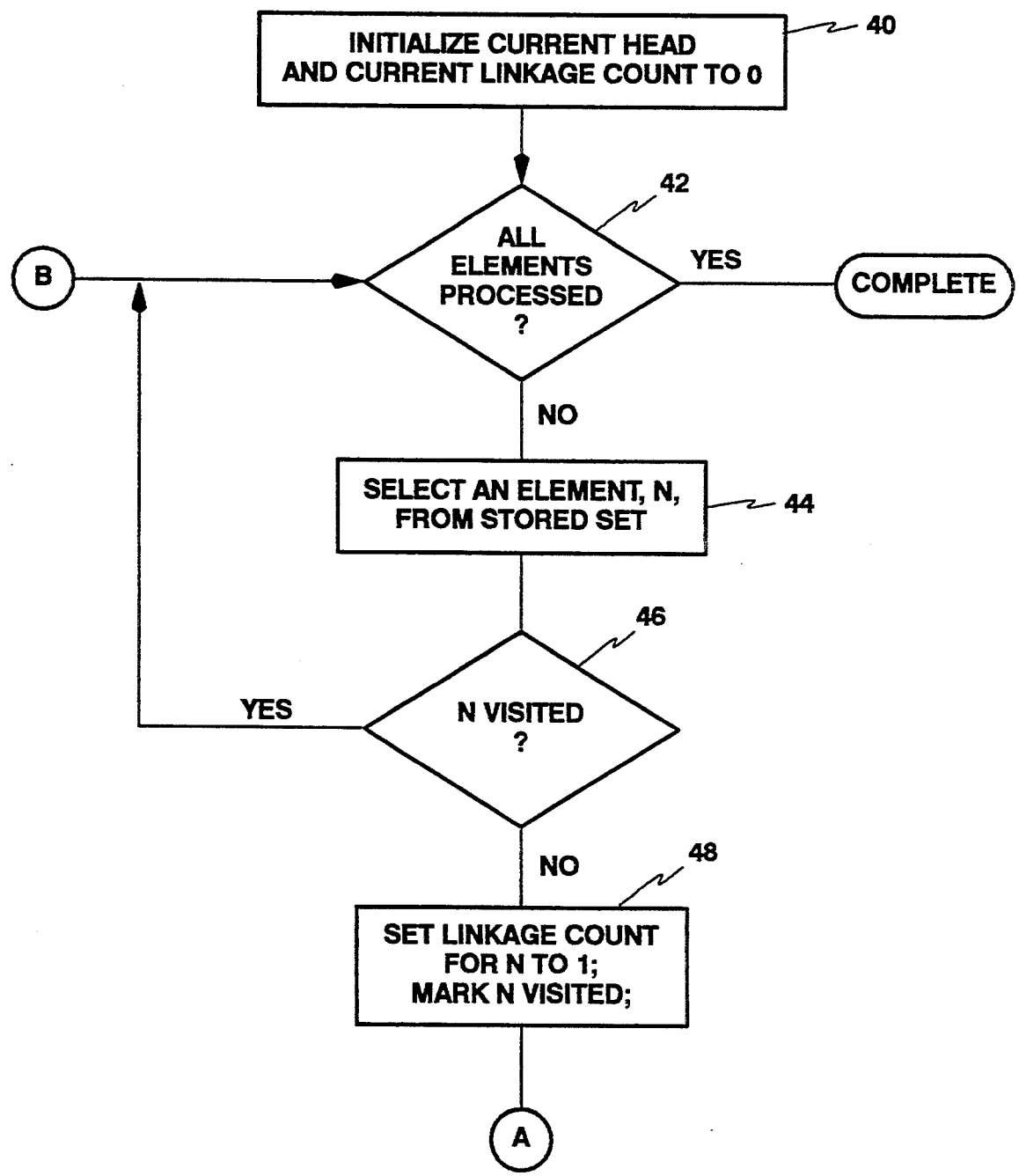
FIGS. 3A and 3B illustrate a method for establishing the head of a linked list in accordance with a second embodiment of the present invention.
Figure 3B:
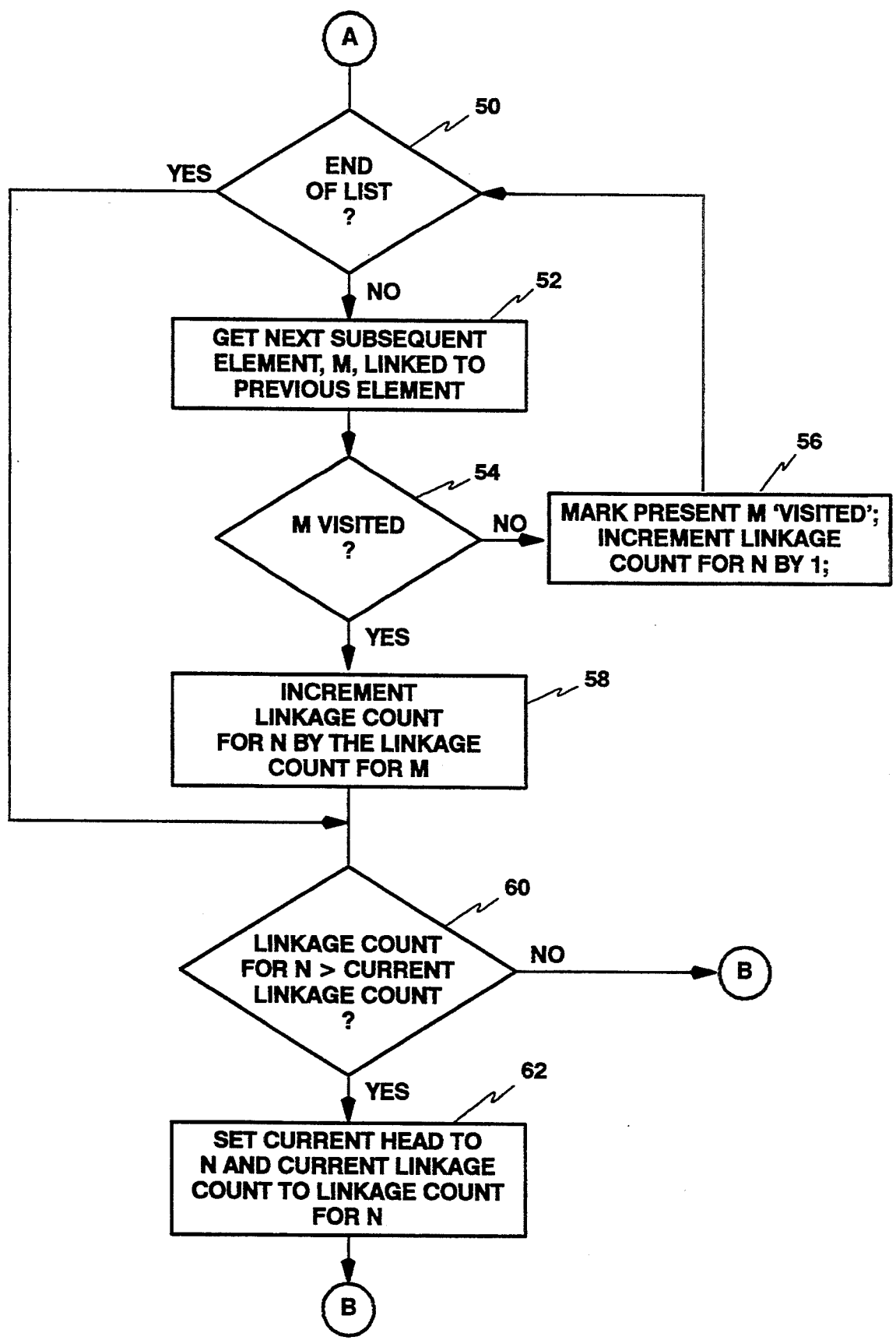

FIGS. 3A and 3B illustrate a second embodiment of a method for establishing the head of link list in accordance with the present invention. As in the first embodiment, the second embodiment assumes that the linked list is not circular, and that the list is intact. According to the second embodiment, an element of the list is selected as a candidate for the head of the list. The list is then traversed from that element to the end of the list by following the pointers of each successive element until the end of the list is reached. A count of the number of linkages between the selected element and the end of list is generated as the list is traversed. Additionally, each element accessed while traversing the list from the selected element to the end of the list is marked as having been "visited".

When processing of the current candidate is complete, another element of the list is selected and processed in the same manner. However, according to an important feature of the second embodiment, if an element selected for processing as a candidate for head of the list has already been "visited" (i.e., during a previous traversal of the list), then no further processing of that element is necessary since that element must have been part of some longer chain. Additionally, according to another important feature of the present embodiment, if while traversing the linkages from a candidate element to the end of the list, an element is encountered that was previously "visited", then the linkage count associated with the previously visited element is added to the linkage count generated up until that point for the candidate element. No further processing of the present candidate is necessary. Such a feature avoids the need to traverse the remainder of the linked list for that candidate element. Adding the count of the previously visited element to that of the present candidate is valid because the linkage count of the "visited" element must have been generated previously while processing that element as a candidate for head of the list, and therefore, the linkage count for that "visited" element represents the exact number of remaining linkages from that point to the end of list. As can be appreciated, these features of the second embodiment avoid unnecessary redundancy, and therefore, provide another efficient method for reestablishing the head of a linked list.

FIGS. 3A and 3B illustrate the method of the second embodiment in greater detail. As shown, the method begins at step 40 where two variables, CURRENT HEAD and CURRENT LINKAGE COUNT, are both initialized to a value of zero. CURRENT HEAD is used to identify the current candidate for head of the list, and CURRENT LINKAGE COUNT represents a count of the number of linkages encountered while traversing the linked list from the CURRENT HEAD to the end of the list. At step 42, it is determined whether all of the stored elements have been processed. At this point, of course, none of the elements have been processed, and therefore, control will pass immediately to step 44 where an element, N, is selected from the memory for processing. As in the first embodiment, there is no limitation on the order in which each element is processed.

At step 46, it is determined whether the selected element has been "visited". If so, no further processing of that element occurs, and control passes back to step 42. If all the elements have not been processed, control will again pass to step 44 where another element, N, will be selected for processing. Assuming that the selected element has not been previously marked "visited", control passes from step 46 to step 48. At this point, the selected element, N, is a potential candidate for head of the list. At step 48, a LINKAGE COUNT for the candidate element, N, is established and set to a value of "1". Element N is then marked as having been visited. Control then passes to step 50.

At step 50, it is determined whether the end of the list has been reached. Specifically, the pointer of the present element (i.e., N) is examined to determine whether a next subsequent element is linked to the present element (i.e., N.NEXT<>NULL). If the end of the list has not been reached, the process continues to step 52 where the next subsequent element, M, linked to the previous element (i.e., N) is retrieved from the memory for processing. At step 54, element M is examined to determine whether it is marked as having been previously visited. If not, control passes to step 56 where the present element M is marked as having been 'visited', and the linkage count being maintained for the candidate element, N, is incremented by 1. Control then passes back to step 50 to determine whether the present element M represents the end of the list. If the present element M is not the end of the list, control will again pass to step 52 where the next subsequent element, M, linked to the previous element M is retrieved for processing in a similar manner. Unless either (i) the end of the list is reached or (ii) an element is reached that has previously been marked 'visited', the process will continue to loop through steps 50–56.

If at step 50, it is determined that the end of the list has been reached, control passes to step 60 where the linkage count generated for the present candidate node, N, is compared to the CURRENT LINKAGE COUNT. The first time step 60 is reached, the CURRENT LINKAGE COUNT will have an initial value of zero, and therefore, control will pass to step 62 where the candidate element, N, is designated as the CURRENT HEAD, and the CURRENT LINKAGE COUNT is set to the linkage count of N. Control then passes back to step 42, and if all the elements have not been processed, another element, N, will be selected as a possible candidate for head of the list.

Ultimately, step 60 will again be reached for a new candidate, and if the linkage count for the new candidate is greater than the CURRENT LINKAGE COUNT (step 62), then the new candidate will replace the previous candidate as the CURRENT HEAD. If, however, the linkage count for the new candidate is not greater than the CURRENT LINKAGE COUNT, then control will again pass back to step 42. The method of the present invention will continue as described above until all of the elements have been processed. After all of the elements have been processed, CURRENT HEAD will identify the head of the linked list.

Referring back to step 54, if it is determined that an element, M, has already been 'visited', control passes to step 58. An element identified in step 54 as having been previously 'visited' must have been a previous candidate for head of the list, and therefore, the linkage count previously generated for that element M can be added to the linkage count of the present candidate, N. Processing of the present candidate, N, can then terminate and control may pass directly to step 60 for further processing as described above. Adding the linkage count of M to the linkage count of N avoids the need to traverse the remainder of the list. As can be appreciated, this feature of the present embodiment avoids redundancy and increases efficiency.

As with the first embodiment, the second embodiment of the method of the present invention may be implemented on any suitable processor. An exemplary implementation of the second embodiment is expressed below in a Pascal-like notation:

```
let X = {1,2,3 ... Z} be the set of elements 1, 2,
3, ... Z of a singularly linked list;
let N represent an element of the set X where N.NEXT
is the pointer to the next subsequent element of the
linked list, N.LINKAGECOUNT is the linkage count
generated for element N when element N is selected as
a candidate for head of the list, and N.VISITED
indicates whether the element has been marked as
visited;
For each element N within set X, do the following:
Begin
if Not N.VISITED then
    Begin
    N.VISITED := TRUE;
    N.LINKAGECOUNT := 1;
    M := N.NEXT;
    While M <> NULL DO
        Begin
        If Not M.VISITED Then
            Begin
            N.LINKAGECOUNT := N.LINKAGE-
                COUNT + 1;
            M.VISITED := TRUE;
            M := M.NEXT;
            End;
        Else
            Begin
            N.LINKAGECOUNT := N.LINKAGECOUNT +
                        M.LINKAGECOUNT;
            M := NULL;
            End;
        End;
    If N.LINKAGECOUNT >
    CURRENT_HEAD.LINKAGECOUNT Then
        CURRENT_HEAD := N;
    End;
End.
```

The foregoing implementation of the second embodiment will always establish the head of a linked list in a time proportional to 2N-1 where N is the number of elements in the linked list. Like the first embodiment, the second embodiment is an order of magnitude faster than the technique described in the Background of the Invention, and therefore, the second embodiment provides another efficient method for establishing the head of a linked list when such information has been lost.

As an example of the operation of the foregoing embodiment, assume that it is again necessary to determine the head of the exemplary linked list of FIG. 1. The following table illustrates the value of the linkage count associated with each element after processing of that element is complete. The example assumes that the elements are selected for processing in the order shown.

| ELEMENT SELECTED | ELEMENTS VISITED/MARKED | LINKAGE COUNT OF SELECTED ELEMENT |
| --- | --- | --- |
| 1 | 1,4 | 2 |
| 2 | 2,3,1 | 4 |
| 3 | 3 | X |
| 4 | 4 | X |
| 5 | 5,6,2 | 6 |
| 6 | 6 | X |

As shown, element 5 has the largest linkage count, and therefore, element 5 will be identified as the head of the list. Note also that when processing element 5, traversal of the list did not continue past element 2 since element 2 had already been processed. Similarly, when processing element 2, traversal of the list did not continue past element 1 since element 1 had already been processed. Moreover, no linkage count was generated for elements 3, 4 and 6 since each of those elements had already been 'visited' (e.g., step 46) when they were selected for processing.

Figure 4:
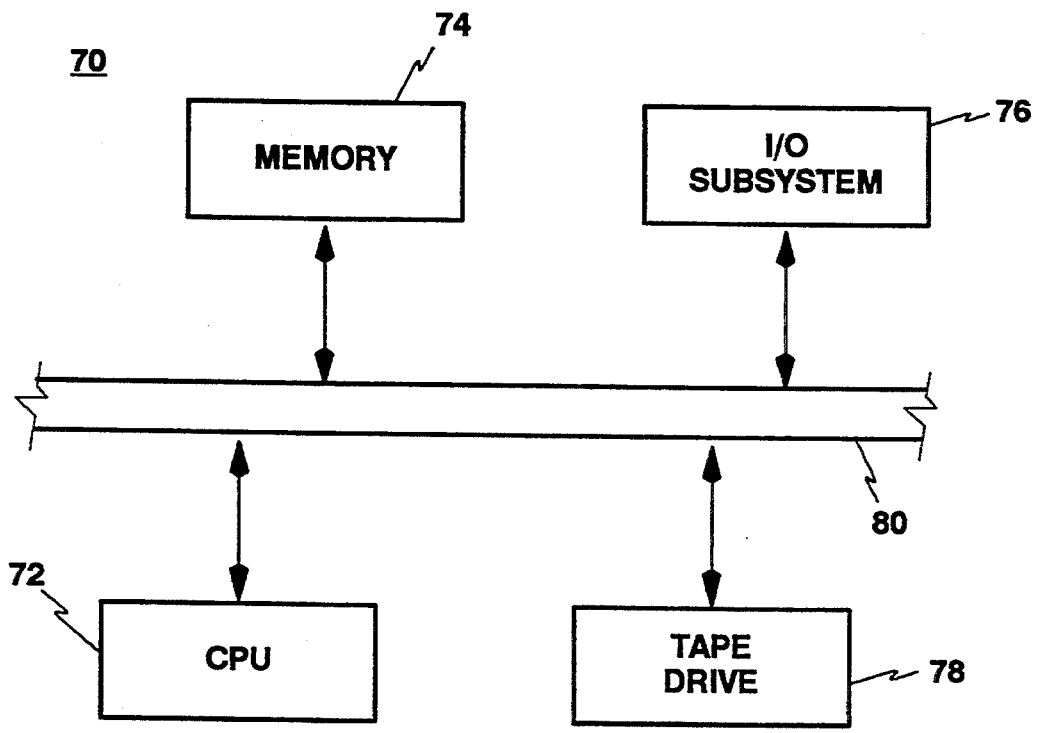
FIG. 4 is a block diagram illustrating an exemplary computer system in which the methods of the present invention may be employed.

FIG. 4 is an exemplary computer system 70 in which the methods of the present invention may be employed. It is understood, however, that the methods of the present invention may be employed in a wide variety of applications, and the present invention is by no means limited to use in systems such as that illustrated in FIG. 4. Rather, the present invention may be employed in any system or application in which the head of a linked list must be reestablished.

As shown in FIG. 4, the exemplary system 70 comprises a central processing unit (CPU) 72, a system memory 74, an I/O subsystem 76 and a peripheral storage device 78 which, in the example shown, comprises an external tape drive. Each of the system components are coupled to a system bus or backplane 80. The CPU 72 maintains, in a reserved area of the system memory, a listing, or queue, of processes to be executed by the CPU 72. The queue comprises a linked list in which each element of the list represents a respective one of the processes and contains information related to the execution of that process, such as its priority, expected completion time, etc. Programs executing on the CPU 72 may maintain other linked list structures in the system memory for a variety of purposes. A diagnostic software tool (not shown) runs on the CPU 72 and provides an ability to "dump" the contents of the system memory 74 to the tape drive 78 for analyzing the memory contents to diagnose software and hardware problems. The I/O subsystem 76 controls access to the system bus.

As explained above, situations may arise in which information identifying the head of a linked list stored in the system memory is either lost or simply not provided in the memory dump, whereas the individual elements of the list are provided and remain intact. Without information identifying the head of the linked list, the diagnostic tool will be unable to process the information contained in that list. According to the present invention, the diagnostic tool operates in accordance with one of the foregoing embodiments to reestablish the head of the linked list. Once the head of the list has been reestablished, analysis of the information contained in the list may resume.

As the foregoing illustrates, the present invention is directed to methods for establishing, or reestablishing, the head of a linked list when such information has been lost or simply not provided. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A computer system comprising:
   a processing unit;
   a memory connected to the processing unit;
   a linked list comprising a plurality of elements each stored at a different location in said memory, each stored element of the linked list comprising information and a pointer that points to a next subsequent stored element in the linked list,
   the processing unit being programmed to:
   a) retrieve one of the stored elements of the linked list from said memory;
   b) identify, from the pointer of said retrieved element, the next subsequent stored element of the linked list;
   c) mark said next subsequent stored element;
   d) repeat steps (a) through (c) for each other stored element of the list; and thereafter,
   e) identify which of said stored elements is not marked, and designate the stored element that is not marked as a head of the linked list,
   whereby the processing unit is able to identify the head of the linked list when such information has been lost or is inaccessible.

2. The computer system of claim 1 wherein said linked list comprises a queue of processes to be executed by the processing unit, each stored element comprising information related to one of the processes in the queue.

3. The computer system of claim 1 wherein said processing unit is further programmed to maintain an array having a plurality of elements equal to the number of stored elements of said linked list, each element of said array corresponding to a respective one of the stored elements of said linked list.

4. The computer system of claim 3 wherein the processing unit is programmed to mark said next subsequent stored element by setting the corresponding element of said array to a pre-defined value indicative of said marking.

5. The computer system of claim 4 wherein the processing unit is programmed to identify which of the stored elements is not marked by identifying the element of said array that is not set to said pre-defined value.

6. The computer system of claim 1 wherein the linked list stored in said memory comprises a singularly linked list.

7. A computer system comprising:
   a processing unit;
   a memory connected to the processing unit;
   a linked list comprising a plurality of elements each stored at a different location in said memory, each stored element of the linked list comprising information and a pointer that points to a next subsequent stored element in the linked list,
   the processing unit being programmed to:
   a) select one of said stored elements from said memory;
   b) traverse successive linkages of the list from the selected element to the end of the list, mark each stored element accessed during said traversal including the selected element, and generate, for the selected element, a linkage count representing the number of linkages traversed from the selected element to the end of the list;
   c) repeat steps (a) and (b) for each of the other stored elements of the list, but only if said other stored element was not marked during a previous traversal of the list; and
   d) identify the stored element for which a largest linkage count was generated, and designate the identified element as a head of the linked list,
   whereby the processing unit is able to identify the head of the linked list when such information has been lost or is inaccessible.

8. The computer system recited in claim 7 wherein if during traversal of the list from a selected element to the end of the list, an element is reached that was marked during a previous traversal of the list, the processing unit is further programmed to terminate the traversal of the list for the selected element and to add the linkage count of the marked element to the linkage count generated for the selected element prior to reaching the marked element.

9. The computer system recited in claim 7 wherein said linked list comprises a singularly linked list.

10. The computer system recited in claim 7 wherein said linked list represents a queue of processes to be executed by the processing unit, each stored element containing information related to one of the processes in the queue.

* * * * *